United States Patent
McMenomey et al.

(10) Patent No.: US 12,457,158 B1
(45) Date of Patent: Oct. 28, 2025

(54) FLOW-TO-QUEUE TELEMETRY AUGMENTATION

(71) Applicant: Hewlett Packard Enterprise Development LP, Spring, TX (US)

(72) Inventors: Jeffrey McMenomey, Auburn, CA (US); Saurabh Mohan, Folsom, CA (US); Joshua Prince, Roseville, CA (US); Nittin Aggarwal, Roseville, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 68 days.

(21) Appl. No.: 18/647,152

(22) Filed: Apr. 26, 2024

(51) Int. Cl.
| | |
|---|---|
| *H04L 43/062* | (2022.01) |
| *H04L 9/40* | (2022.01) |
| *H04L 47/2483* | (2022.01) |
| *H04L 47/30* | (2022.01) |
| *H04L 47/625* | (2022.01) |

(52) U.S. Cl.
CPC ........ *H04L 43/062* (2013.01); *H04L 47/2483* (2013.01); *H04L 47/30* (2013.01); *H04L 47/6255* (2013.01); *H04L 63/20* (2013.01)

(58) Field of Classification Search
CPC ... H04L 43/062; H04L 47/2483; H04L 47/30; H04L 47/6255
See application file for complete search history.

(56) References Cited

U.S. PATENT DOCUMENTS

| | | | |
|---|---|---|---|
| 10,547,560 B1 | 1/2020 | Patel et al. | |
| 10,924,374 B2 | 2/2021 | Kfir et al. | |
| 10,944,652 B2 | 3/2021 | Punj et al. | |
| 11,146,468 B1 | 10/2021 | Chandrasekaran et al. | |
| 11,611,494 B2 | 3/2023 | Labonte et al. | |
| 2010/0106866 A1* | 4/2010 | Aybay | H04L 47/125 710/29 |
| 2012/0320788 A1* | 12/2012 | Venkataramanan | H04L 47/2441 370/253 |
| 2014/0119193 A1* | 5/2014 | Anand | H04L 47/125 370/237 |

* cited by examiner

*Primary Examiner* — Caroline H Jahnige
(74) *Attorney, Agent, or Firm* — Slater Matsil, LLP

(57) ABSTRACT

In certain implementations, a method includes receiving, at an ingress interface, a network traffic flow comprising a plurality of network data units; providing the plurality of network data units to a switching component; transmitting the plurality of network data units from the switching component to a hardware offload component prior to determining an egress interface for the plurality of network data units; processing, by the hardware offload component, the plurality of network data units to generate a flow report corresponding to the network traffic flow; transmitting the flow report from the hardware offload component to a control plane; processing, in the control plane, the flow report to determine an egress interface associated with the network traffic flow; updating the flow report to include the egress interface to obtain an updated flow report; and transmitting the updated flow report to a remote collector.

20 Claims, 5 Drawing Sheets

FLOW-TO-QUEUE TELEMETRY AUGMENTATION

BACKGROUND

Monitoring of network traffic flows may provide information about flows and patterns of network traffic in a network. Network devices may generate statistics related to network data units that are received and/or transmitted from a network device. However, network traffic flow information and information about network traffic passing through a particular network device may be difficult to correlate in some circumstances.

BRIEF DESCRIPTION OF THE DRAWINGS

Certain examples discussed herein will be described with reference to the accompanying drawings listed below. However, the accompanying drawings illustrate only certain aspects or implementations of examples described herein by way of example, and are not meant to limit the scope of the claims.

Figure 1:
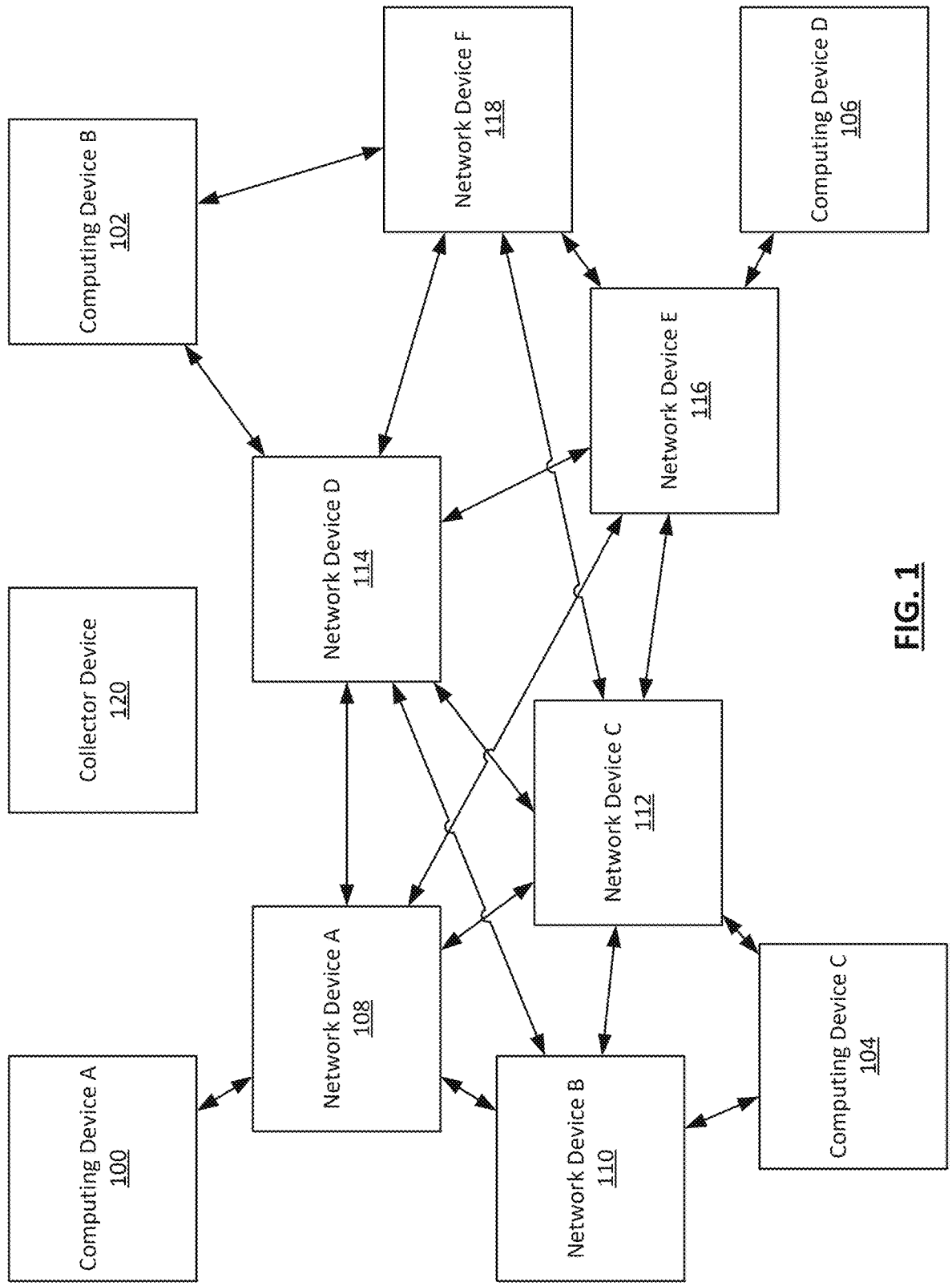
FIG. 1 illustrates a block diagram of an example system in which flow telemetry may be implemented in accordance with one or more examples disclosed herein.

The figures are drawn to illustrate various aspects of the disclosure and are not necessarily drawn to scale.

DESCRIPTION

The following disclosure provides many different examples for implementing different features. Specific examples of components and arrangements are described below to simplify the present disclosure. These are, of course, merely examples and are not intended to be limiting.

Data is often sent over a network in the form of network data units (e.g., packets, frames, and the like). Sets of network data units having at least some characteristics (e.g., source information, destination information, protocol information, type of service, transmitted within a certain time frame) in common may be considered as part of a network traffic flow. Flow monitoring refers to techniques by which information about network traffic flows are gathered and reported, often to a separate collector device. Flow reports are often generated, at least in part, on network devices through which the network traffic flows traverse. Separately, such network devices are often configured to provide telemetry data, such as information, statistics, and the like related to the state of the network device, the quantities of network data units passing through various interfaces, queues, and the like, as well as queue depths, queue buffer memory usage, and other relevant statistics.

However, in some scenarios, it may be challenging to correlate information from network traffic flow reports with telemetry information from a network device related to particular egress interfaces and queues. As an example, a flow report may be generated by one component of a network device as network data units traverse the components of the network device from an ingress interface to an egress interface. If the flow report is generated by a component that exists in the network device at a point in the path through the network device that is before a decision is made regarding which egress interface will be used to transmit network data units towards their destinations, then egress interface information is not available to be included in the flow report by the component generating the flow report. Therefore, the queues, in association with the corresponding egress interface, may not be easily identifiable, leading to challenges associating telemetry data related to an egress interface generated by a network device with information about network traffic flows that may be transmitted from the egress interface.

In order to address at least the aforementioned challenges, examples disclosed herein include techniques for configuring a network device to augment flow reports generated by a component of the network device prior to the determination of an egress interface for network data units with information identifying the egress interface for the network traffic flow prior to sending the flow report to a remote collector.

In one or more examples, a network device includes various components that include one or more switching components (e.g., switching application specific integrated circuits (ASICs)) as well as one or more components, which may be referred to as hardware offload components, for offloading certain actions from the switching components (or other components of the network device). As an example, a hardware offload component may be a component through which network data units are sent so that flow information may be ascertained and flow reports (e.g., Internet Protocol (IP) Flow Information Export (IPFIX) reports) generated based on such information. Such hardware offload components may be configured to perform any number of other functions, such as, for example, applying security policies (e.g., firewall, drop policies, and the like) configured for the network device.

Thus, network data units may arrive at an ingress interface of a network device, be processed to determine that they are to be transmitted to a hardware offload component, transmitted to the hardware offload component where flow information from the network data units is obtained, then transmitted back to a switching component to be further processed to determine an egress interface for the network data units. However, in this traversal of network data units through the components of the network device, the flow information is ascertained from network data units, and the flow reports generated, before the egress interface is determined.

As an example, when a hardware offload component is configured to perform security functions (e.g., apply security policies configured on the network device), network data units may be transmitted to the hardware offload component prior to a switching component making a determination of what egress interfaces will be used to transmit the network data units towards a destination. In one or more examples, when the hardware offload unit is also configured to generate flow reports, the flow reports cannot include information related to the egress interface, as the egress interface has not yet been determined. The hardware offload component may be able to ascertain a queue number associated with a network data unit, as a network data unit may be assigned to a queue prior to being provided to the hardware offload unit.

However, a queue number may not be associated with a particular egress interface prior to a determination being made regarding the egress interface from which a network data unit is to be transmitted. As an example, each egress interface may have eight corresponding queues, numbered zero through seven, and the thus queue number, by itself, does not particularly identify the egress interface with which the queue is associated. Therefore, if a flow report includes a queue number but not an egress interface, then the queue, and telemetry data from the network device related thereto, cannot be associated with the corresponding egress interface based on the flow report.

In one or more examples, to identify the egress interface associated with a flow, the hardware offload component may transmit the flow report to the control plane of the network device, where one or more processors may execute processes (e.g., software) that use the information included in the flow report (e.g., source and destination IP address, source and destination Media Access Control (MAC) address, and/or any other relevant information) to determine what egress interface will be used by a switching component to transmit network data units of the flow towards a destination. The control plane of the network device may include all of the information used to program the switching component(s) of the network device to make switching decisions. Accordingly, the control plane may use the information used to program the switching component(s) to derive the egress interface that a switching component will ultimately determine to use after network data units are returned to the switching component from the hardware offload component to the switching component. In one or more examples, the egress interface determined by the control plane may then be added to the flow report before the flow report is transmitted to a collector device.

Certain examples described in this disclosure may provide techniques for associating flow information in flow reports with egress interfaces used for transmitting network data units in the flows in scenarios where a network device is configured to use a hardware offload component of the network device to generate the flow reports before a switching component of the network device determines the egress interface for network data units of the network traffic flow. In one or more examples, the egress interface may be determined by executing a software process in the control plane of the network device that derives the egress interface using information included in the flow report and information that is used to program the switching component, which determines the egress interface for the network data units after the flow report is generated. Accordingly, flow reports sent from a network device may include the egress interface associated with the flow even though the initial flow reports generated by the hardware offload component lack information associating a flow with an egress interface.

FIG. 1 illustrates a block diagram of an example system in which flow telemetry may be implemented in accordance with one or more examples disclosed herein. As shown in FIG. 1, the system includes computing devices (e.g., computing device A 100, computing device B 102, computing device C 104, computing device D 106). The computing devices may be operatively connected via a network that includes any number of network devices (e.g., network device A 108, network device B 110, network device C 112 network device D 114, network device E 116, network device F 118). The system may also include a collector device 120. Each of these components is described below.

Figure 5:
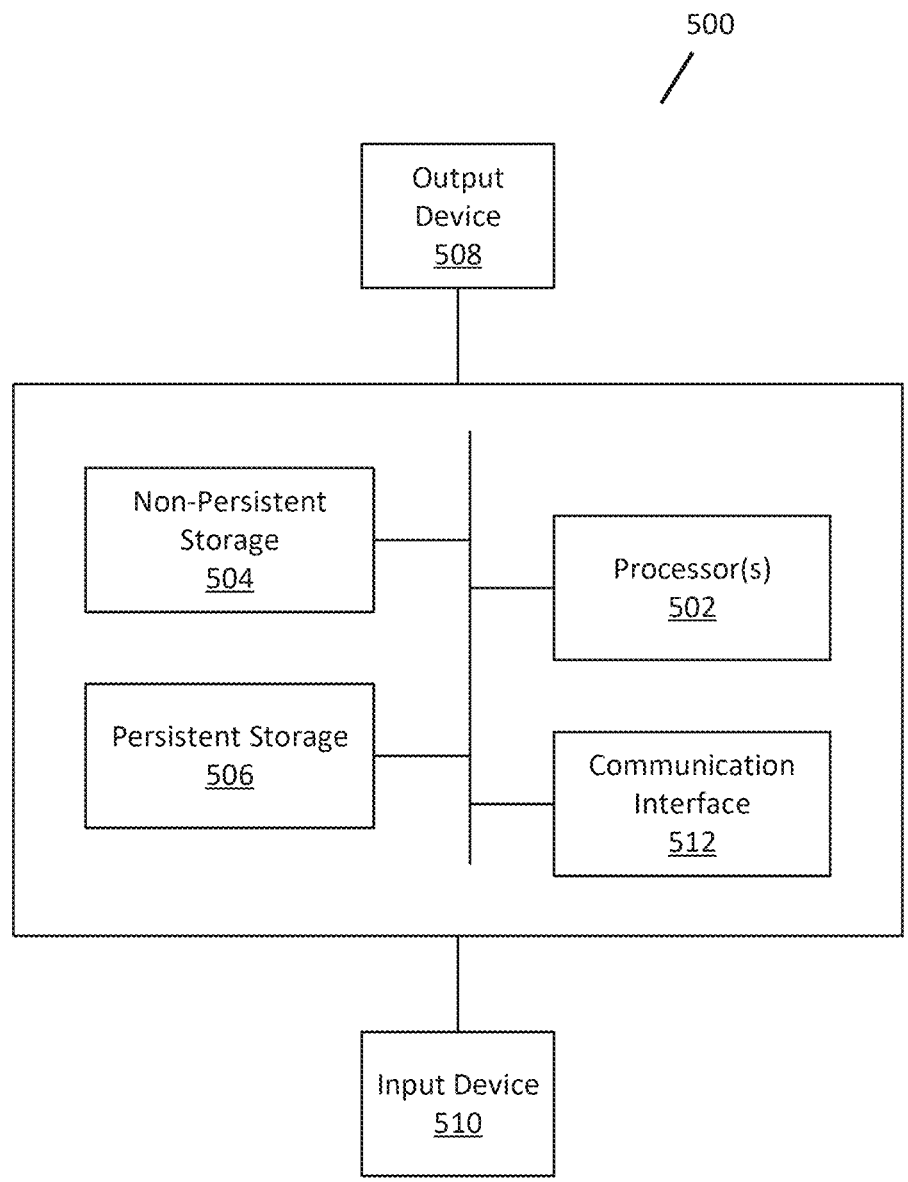
FIG. 5 illustrates a block diagram of a computing device, in accordance with one or more examples disclosed herein.

In one or more examples, as used herein, a computing device (e.g., 100, 102, 104, 106), may be any single computing device, a set of computing devices, a portion of one or more computing devices, or any other physical, virtual, and/or logical grouping of computing resources. One example of a computing device is shown in FIG. 5, and described below.

Examples of computing devices include, but are not limited to, a server (e.g., a blade-server in a blade-server chassis, a rack server in a rack, a desktop server, any other type of server device), a desktop computer, a mobile device (e.g., laptop computer, smart phone, personal digital assistant, tablet computer, automobile computing system, and/or any other mobile computing device), a storage device (e.g., a disk drive array, a fibre channel storage device, an Internet Small Computer Systems Interface (iSCSI) storage device, a tape storage device, a flash storage array, a network attached storage device, any other type of storage device), a network device (e.g., switch, router, multi-layer switch, any other type of network device), a virtual machine, a virtualized computing environment, a logical container (e.g., for one or more applications), a container pod, an Internet of Things (IoT) device, an array of nodes of computing resources, a supercomputing device, a data center or any portion thereof, and/or any other type of computing device with the aforementioned requirements.

In one or more examples, any or all of the aforementioned examples may be combined to create a system of such devices, or may be partitioned into separate logical devices, which may collectively be referred to as a computing device. Other types of computing devices may be used without departing from the scope of examples described herein, such as, for example, the computing device shown in FIG. 5 and described below. The system may include any number and/or type of such computing devices in any arrangement and/or configuration without departing from the scope of examples disclosed herein.

In one or more examples, the storage and/or memory of a computing device or system of computing devices may be and/or include one or more data repositories for storing any number of data structures storing any amount of data (e.g., information). In one or more examples, a data repository is any type of storage unit and/or device (e.g., a file system, database, collection of tables, RAM, hard disk drive, solid state drive, and/or any other storage mechanism or medium) for storing data. Further, the data repository may include multiple different storage units and/or devices. The multiple different storage units and/or devices may or may not be of the same type or located at the same physical location.

In one or more examples, any storage and/or memory of a computing device or system of computing devices, and/or network devices, may be considered, in whole or in part, as non-transitory computer readable mediums storing software and/or firmware, which, when executed by one or more processors, cause the one or more processors to perform operations in accordance with one or more examples disclosed herein.

In one or more examples, any number of computing devices (e.g., 100, 102, 104, 106) may be operatively connected to any number of other computing devices via a network. A network may refer to an entire network or any portion thereof (e.g., a logical portion of the devices within a topology of devices). A network may include a datacenter network, a wide area network, a local area network, a wireless network, a cellular phone network, an InfiniBand network, and/or any other suitable network that facilitates the exchange of information from one part of the network to another. A network may be a combination of any of the aforementioned network types. A network may be located at a single physical location or be distributed at any number of physical sites. In one or more examples, a network may be coupled with or overlap with, at least in part, the Internet.

In one or more examples, a network includes any number of network devices (e.g., 108, 110, 112, 114, 116, 118). In one or more examples, a network device (e.g., 108, 110, 112, 114, 116, 118) is a device that includes and/or is operatively connected to persistent storage (not shown), memory (e.g., random access memory (RAM)) (not shown), one or more processor(s) (e.g., integrated circuits, ASICs, and the like) (not shown), and at least one physical network interface (not shown), which may also be referred to as a port, and which may provide connections (i.e., links) to other devices (e.g., computing devices, other network devices).

In one or more examples, a network device (e.g., 108, 110, 112, 114, 116, 118) also includes any number of additional components (not shown), such as, for example, network chips (e.g., switching chips that are used, at least in part, to store forwarding information and process network traffic), FPGAs, application specific integrated circuits (ASICs), content addressable memories (CAMs), line cards, indicator lights, fans, power supply units, power distribution units, hardware offload components, and the like. As an example, at least a portion of such hardware components may be included as part one or more of what may be referred to as line cards of a network device. Forwarding information (which may include all or any portion of information that may be referred to as the 'FIB') may, for example, be stored (e.g., in various tables) in one or more hardware components of the line cards, such as MAC tables, route table entries, multicast forwarding entries, and the like, which is sometimes referred to as being part of a data plane. In one or more examples, a network device includes information, such as a routing information base (RIB) that includes information (e.g., obtained from various routing protocols) that may be used to program components of the network device to propagate network data units. Such information is sometimes referred to as being in the control plane, which may include a variety of components of a network device (e.g., processors, operating system, agents, daemons, and the like.). A network device may include any other components in any arrangement without departing from the scope of examples described herein, and, as such is not limited to any arrangement of components shown in any figure and/or described herein.

In one or more examples, as discussed above, a network device includes at least one physical interface (and often two or more such physical interfaces). In one or more examples, physical interfaces are any hardware, software, or combination thereof that include functionality to receive and/or transmit network data units (e.g., packets, frames, and the like) or any other information to or from a network device. Physical interfaces may include any interface technology, such as, for example, optical, electrical, and the like. Physical interfaces may be configured to interface with any transmission medium (e.g., optical fiber, copper wire(s), and the like).

In one or more examples, a network device includes any software (e.g., various daemons, a state database), firmware, and the like, configured to perform and/or allow other components to perform various functions of the network device (e.g., to process network traffic). Such software may, for example, execute using one or more processors of a network device, or any other hardware resource of a network device capable of executing software.

Examples of a network device (e.g., 108, 110, 112, 114, 116, 118) include, but are not limited to, a switch, a router, a multilayer switch, a fibre channel device, an InfiniBand® device, and the like. A network device is not limited to the aforementioned specific examples. As an example, any computing device (discussed above) may be configured, at least in part, as a network device as used herein.

In one or more examples, a network device includes functionality to receive network data units (e.g., frames, packets, tunneling protocol frames, and the like.) at any of the physical interfaces (e.g., ports) of the network device, and to process the network data units (e.g., to receive, transmit, consume). In one or more examples, processing network traffic includes, but is not limited to, a series of one or more lookups (e.g., longest prefix match (LPM) lookups, forwarding equivalence class (FEC) lookups, and the like) and corresponding actions (e.g., forward from a certain egress port, add a labeling protocol header, rewrite a destination address, encapsulate, decapsulate, and the like). Examples of network traffic processing include, but are not limited to, determining: (i) whether to take a security action (e.g., drop the network data unit, provide the network data unit to a security device); (ii) whether to mirror the network traffic data unit; and/or (iii) how to route/forward the network traffic data unit in order to transmit the network traffic data unit from an interface of the network device. A network device may perform other operations, functions, and the like with respect to a network data unit without departing from the scope of examples disclosed herein. An example of a network device is discussed further in the description of FIG. 2, below.

In one or more examples, network data units sent between computing devices (described above) over a network (described above) via network devices (described above) may be part of a network traffic flow. In one or more examples, a network traffic flow is a set of network data units having at least some characteristics (e.g., source information, destination information, protocol information, type of service, transmitted within a certain time frame) in common with one another. Flow monitoring may refer to techniques by which information about network traffic flows are gathered and reported, often to a separate collector device (described below). Flow reports are often generated, at least in part, on network devices (e.g., 108, 110, 112, 114, 116, 118) through which the network traffic flows traverse. Separately, such network devices are often configured to provide telemetry data, such as information, statistics, and the like related to the state of the network device, the quantities of network data units passing through various interfaces, queues, and the like, of the network device queue depths, queue buffer memory usage, and the like.

A network traffic flow may be any set of network data units that traverse a network. As an example, a network traffic flow may be a set of network traffic units that traverse from the computing device A 100 to the computing device D 106 through a network that includes any portion of the network devices (e.g., 108, 110, 112, 114, 116, 118), and may or may not traverse a determined path, depending on various factors that exist at a given time within the network. Thus, gaining insight into how network traffic flows traverse and/or impact a network and the devices therein may be challenging. As an example, it may be challenging to correlate information from network traffic flow reports with telemetry information from a network device related to particular egress interfaces and queues of the network device. An example of such a challenge is that a flow report may be generated by one component of a network device as network data units traverse the components of the network device from an ingress interface of the network device (e.g.,

108, 110, 112, 114, 116, 118) and an egress interface of the network device. If the flow report is generated by a component that exists in the network device (e.g., 108, 110, 112, 114, 116, 118) at a point in the path through the network device that is before a decision is made regarding which egress interface will be used to transmit network data units towards their destinations, then egress interface information is not available to be included in the flow report. Therefore, the queues associated with the egress interface of a network device may not be easily identifiable, leading to challenges associating telemetry data related to an egress interface generated by a network device with information about network traffic flows that may be transmitted from the egress interface. Such challenges may be exacerbated for network devices (e.g., 108, 110, 112, 114, 116, 118) through which network traffic to and/or from any number of computing devices (e.g., 100, 102, 104, 106) and/or any number of other network devices (e.g., 108, 110, 112, 114, 116, 118) traverse over time.

In one or more examples, the system shown in FIG. 1 shows the collector device 120. Although not shown in FIG. 1, the collector device 120 may be operatively connected to all or any portion of the network devices (e.g., 108, 110, 112, 114, 116, 118) of a network. In one or more examples, the collector device 120 is any device (e.g., a computing device, a network device) that is configured to receive flow reports from any number of network devices of a network. A collector device (e.g., 120) may be configured to store information related to network traffic flows through a network, which may be used for any purpose (e.g., analyzing network performance). Such information related to network traffic flows may be aggregated from any number of flow reports received from any number of network devices. In one or more examples disclosed herein, such flow reports may be augmented to include information related to egress interfaces of network devices that network data units of a network traffic flow traverse when exiting a network device, as well as queues associated with the egress interface. In one or more examples, having such egress interface information may allow for an improved ability to associate network traffic flows with egress interfaces and queues, which may allow for determination of queues and/or interfaces that have the highest flow counts, have the most data passing through, are congested, and any other relevant network conditions.

While FIG. 1 shows a particular configuration of components, other configurations may be used without departing from the scope of examples described herein. For example, although FIG. 1 shows certain components as part of the same device, any of the components may be grouped in sets of one or more components which may exist and execute as part of any number of separate and operatively connected devices. As another example, a single component may be configured to perform all or any portion of the functionality performed by the components shown in FIG. 1. Accordingly, examples disclosed herein should not be limited to the configuration of components shown in FIG. 1.

Figure 2:
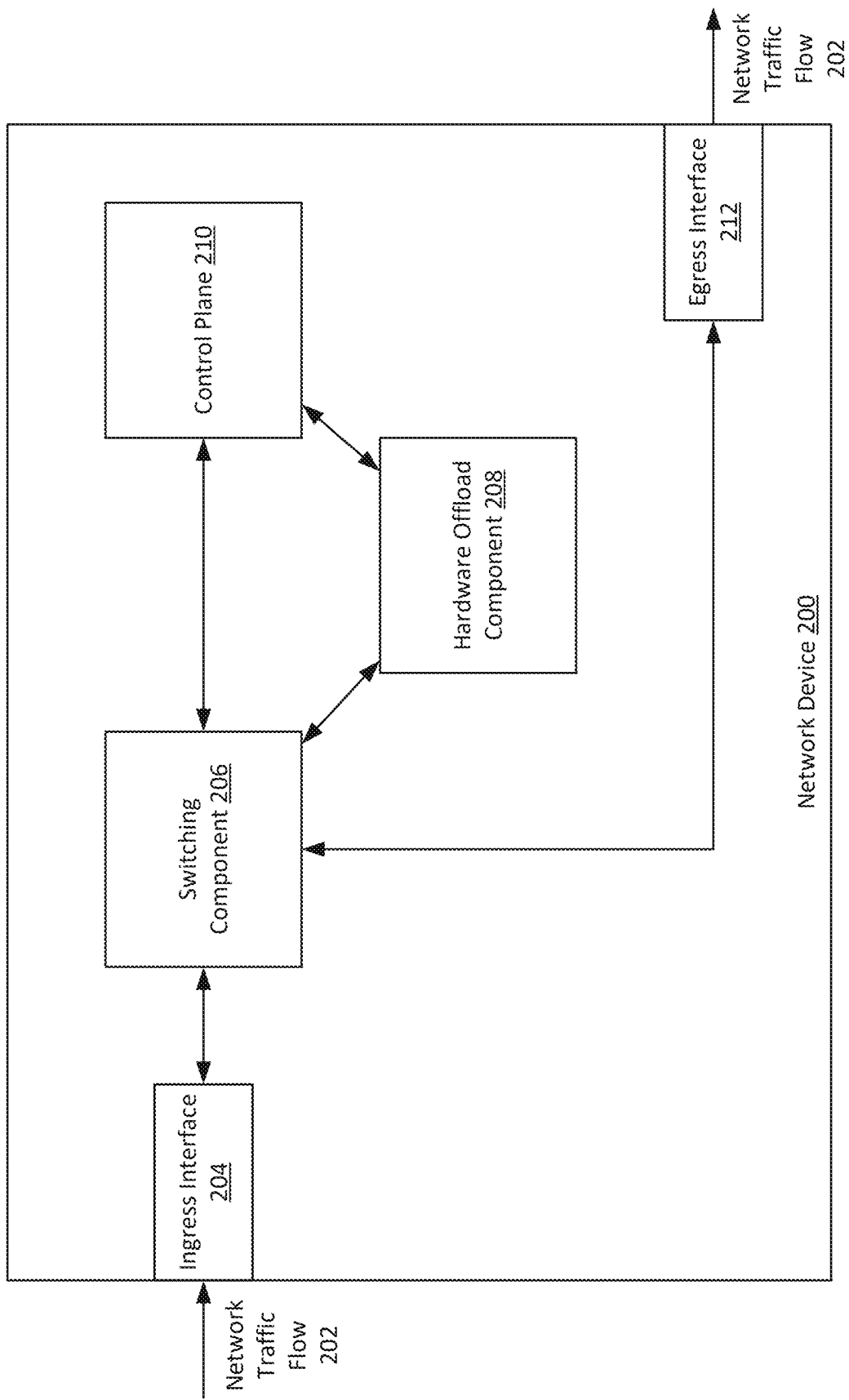
FIG. 2 illustrates a block diagram of an example network device in accordance with one or more examples disclosed therein.

FIG. 2 illustrates a block diagram of an example network device in accordance with one or more examples disclosed therein. As shown in FIG. 2, the network device 200 includes an ingress interface 204, a switching component 206, a control plane 210, a hardware offload component 208, and an egress interface 212. Each of these components is described below.

In one or more examples, the network device 200 is one example of any of the network devices (e.g., 108, 110, 112, 114, 116, 118) shown in FIG. 1 and discussed above. As such, the network device 200 may receive network data units at the ingress interface 204, which may be one of any number of ingress interfaces of the network device 200. The network device 200 may also transmit network data units from the egress interface 212, which may be one of any number of egress interfaces of the network device 200. Network data units traversing the network device 200 may be part of a network traffic flow 202, which, as described above, may be a set of network data units traversing the network device 200 that have at least some characteristics in common with one another.

In one or more examples, the network device 200 includes a switching component 206. Although FIG. 2 shows the network device 200 including a single switching component 206, the network device 200 may include any number of switching components without departing from the scope of examples disclosed herein. In one or more examples, the switching component may be any hardware (e.g., circuitry), or any combination of such hardware with software and/or firmware, that is configured to process network data units in order to propagate the network data units within and/or from the network device 200. The switching component 206 may be and/or include any number of components, such as, for example, an ASIC, a FPGA, a CAM device, and the like. After being received at the ingress interface 204, a network data unit may be provided to the switching component 206 for processing. As an example, such processing may include initial processing to determine certain items of information (e.g., a queue number for an as-of-yet undetermined egress interface from which the network data unit may be transmitted), and/or whether the network data unit is to be provided to a hardware offload component (e.g., the hardware offload component 208, discussed below) for further processing. In one or more examples, the switching component 206 may perform initial processing of a network data unit and determine that the network data unit is to be provided to a hardware offload component (e.g., 208) before the switching component determines an egress interface (e.g., the egress interface 212) from which the network data unit will be transmitted. As an example, the switching component 206 may provide a network data unit to the hardware offload component 208 to apply a security policy before any determination is made as to what, if any, egress interface should be used to transmit the network data unit. In such an example, a network data unit may be provided back to the same switching component 206, or another switching component of the network device 200, after processing by a hardware offload component so that an egress interface may be ascertained, and the network data unit propagated towards a destination.

In one or more examples, the network device 200 includes the hardware offload component 208. Although FIG. 2 shows the network device 200 including a single hardware offload component 208, the network device 200 may include any number of hardware offload components without departing from the scope of examples disclosed herein. In one or more examples, the hardware offload component 208 may be any hardware (e.g., circuitry), or any combination of such hardware with software and/or firmware, that is configured to perform any number of operations, actions, and/or any other processing related to network data units traversing the network device 200. In one or more examples, the hardware offload component 200 is a component that includes hardware (e.g., circuitry), and may also execute software and/or firmware, and that is intended to perform various operations (e.g., security operations, flow report generation operations) in order to offload such operations from being performed by one or more other components of a network device (e.g., one or more processors of a control plane of the network device, one or more switching components of the network device, any other components of the network device). The hardware offload component 208 may perform at least a portion of the processing of network data units such that other components of the network device 200 may not be used for the same, thereby offloading such processing from the other components to the hardware offload component 208. As an example, the hardware offload component 208 may be configured, at least in part, to be a security component that applies security policies (e.g., a firewall, access control lists, and the like) configured on the network device 200 to network data units received at the network device 200 (e.g., at the ingress interface 204).

In one or more examples, the hardware offload component 208 is configured to generate flow reports for network traffic flows of network data units that are received by and transmitted from the network device 200. For example, the hardware offload component 208 may be configured to generate IPFIX reports, SFlow reports, and the like. Other types of flow reports may be generated by the hardware offload component 208 without departing from the scope of examples disclosed herein. A flow report may include any information relevant to a network traffic flow. Examples of such information may include, but are not limited to, source information (e.g., IP address, MAC address), destination information, port numbers, types, lengths, time information, quantity of network data units of the network traffic flow, sequence numbers, and/or any other metadata about the network traffic flow and network data units included therein. Such information may or may not include information provided to the hardware offload component 208 from the switching component 206 (e.g., based on initial processing of the network data units), such as, for example, a queue number that will be used for an egress interface once the egress interface is ultimately determined for a network data unit. In one or more examples, flow reports are intended to be transmitted from the network device 200 to a remote collector (e.g., the collector device 120 of FIG. 1). The hardware offload component 208 may store information corresponding to any number of network data units, any portion of which may be used to generate a flow report for a network traffic flow that includes at least a portion of the network data units received at the hardware offload component 208.

In one or more examples, the network data units are provided to the hardware offload component 208 before a determination is made (e.g., by the switching component 206) of an egress interface (e.g., the egress interface 212) for the network data unit. Accordingly, a flow report generated by the hardware offload component 208 may lack information regarding what egress interface network data units of a network traffic flow will be transmitted from. The hardware offload component 208 may provide network data units back to a switching component (which may or may not be the same switching component from which the network data unit is received), so that, if appropriate (e.g., based on an applied security policy), an egress interface may be determined, and the network data units propagated towards a destination. Separately, the hardware offload component may, once a flow report has been generated, transmit the flow report to a control plane 210 of the network device 200.

In one or more examples, the network device 200 includes the control plane 210. As used herein, the control plane 210 may refer to a variety of components, elements, processes, software, agents, and the like that control how the network device 200 operates to process network data units. As an example, the control plane may include elements such as an operating system, various protocol agents (e.g., routing protocols), agents that control other components of the network device 200, and the like. Various elements of the control plane 210 may, for example, execute, at least in part, using one or more processors and one or more memory devices of the network device 200. In one or more examples, the control plane 210 is configured to program other components of the network device (e.g., the switching component 206) to operate, at least in part, as part of a data plane that implements a forwarding process for propagating network data units through the network device 200. As such, the control plane 210 may be configured to include or otherwise have access to information that is used to program the switching component 206, and that allows the switching component 206 to determine an egress interface (e.g., the egress interface 212) for a network data unit. Therefore, in one or more examples, the control plane 210 may use various items of information (e.g., source information, destination information) that is included in flow reports received from the hardware offload component 208 to ascertain an egress interface that will be used by the network traffic flow corresponding to the flow report. As an example, the control plane 210 may perform the same type of lookups that a switching component might perform to determine the egress interface that will be used for network data units of a network traffic flow. In one or more examples, the egress interface information may be appended or otherwise included in the flow report before the flow report is transmitted to a collector device (e.g., the collector device 120 of FIG. 1).

Thus, in one or more examples, even though flow reports may be generated by the hardware offload component 208 prior to a determination of an egress interface, thereby causing the flow reports to lack egress interface information, the control plane 210 may add egress interface information to the flow reports, thereby allowing the remote collector that receives a flow report from the control plane 210 to associate a network traffic flow with an egress interface, including associating queue numbers assigned to network data units of the network traffic flow with the egress interface.

While FIG. 2 shows a particular configuration of components, other configurations may be used without departing from the scope of examples described herein. For example, although FIG. 2 shows certain components as part of the same device, any of the components may be grouped in sets of one or more components which may exist and execute as part of any number of separate and operatively connected devices. As another example, a single component may be configured to perform all or any portion of the functionality performed by the components shown in FIG. 2. Accordingly, examples disclosed herein should not be limited to the configuration of components shown in FIG. 2.

Figure 3:
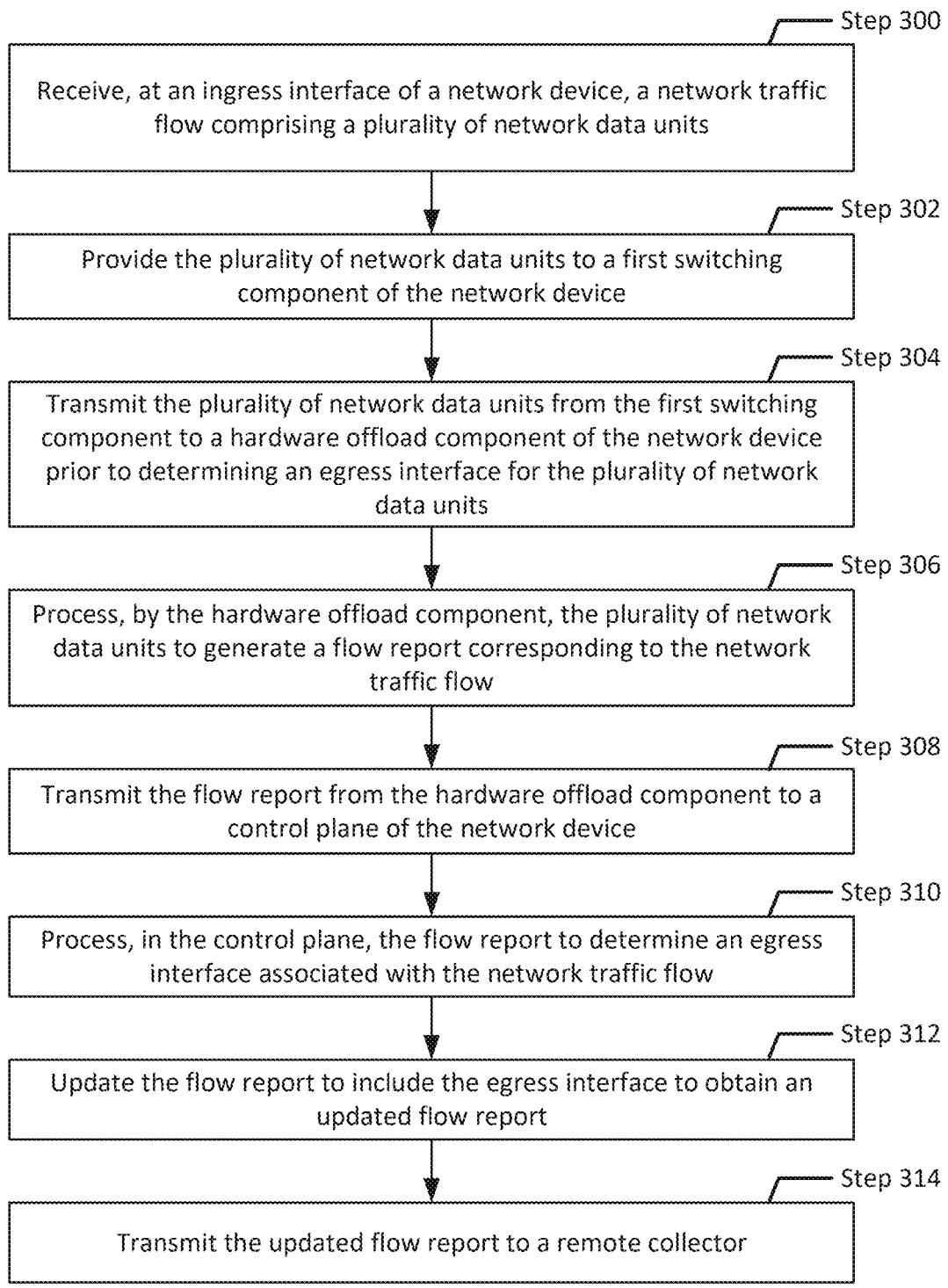
FIG. 3 illustrates an overview of an example method for augmenting flow reports to include egress interface information in accordance with one or more examples disclosed herein.

FIG. 3 illustrates an overview of an example method for augmenting flow reports to include egress interface information in accordance with one or more examples disclosed herein. The method may be performed, at least in part, by a network device (e.g., the network device 200 shown in FIG. 2), and/or any one or more components included therein (e.g., the switching component 206, the hardware offload component 208, and/or the control plane 210 shown in FIG. 2).

In Step 300, the method includes receiving, at an ingress interface of a network device, a network traffic flow comprising a plurality of network data units. In one or more examples, a network traffic flow is a set of network data units having at least some characteristics in common with one another (e.g., source information, destination information, protocol information, type of service, transmitted within a certain time frame). As an example, a set of network data units that are transmitted within a certain timeframe from the same source IP address and are destined for the same destination IP address may be a network traffic flow. In one or more examples, such a network traffic flow may be transmitted via a network. Such a network may include any number of network devices (e.g., the network device 200 of FIG. 2), at least a portion of which are included in a path from the source of the network traffic flow to the destination of the network traffic flow. As such, at least a portion of the network data units of the network traffic flow may arrive at an ingress interface (e.g., the ingress interface 204 of FIG. 2) of a network device on the path.

In Step 302, the method includes providing the plurality of network data units to a first switching component of the network device. In one or more examples, network data units that arrive at a network device are processed to determine what the network device should do in response to receipt of the network data unit. For example, a network data unit may be transmitted to another network device (e.g., forwarded), transmitted to a destination device, dropped, mirrored, sent to a quarantine device for analysis, cause performance of some action or operation by the network device, or any other action that may be taken with regards to or in response to a received network data unit. At least a portion of such processing may be performed by a switching component (e.g., the switching component 206 of FIG. 2) of a network device. In one or more examples, the switching component may process the network data unit to determine that the network data unit should be transmitted to a hardware offload component (e.g., the hardware offload component 208 of FIG. 2). In some examples, most network data units received at a network device are to be provided to a hardware offload component.

As an example, a network device may be configured with one or more hardware offload components that are configured to offload operations from other processors of the network device and implement security policies configured for the network device. Thus, all network data units that should be assessed pursuant to one or more configured security policies are determined by the switching component to be transmitted to a hardware offload component.

The switching component may perform any amount of additional processing without departing from the scope of examples disclosed herein. As an example, the switching component may determine a queue number that will be used for an egress interface when, or if, an egress interface is determined for the network data unit. However, in one or more examples, the actual egress interface that will be used is not determined prior to the network data unit being provided to a hardware offload component. As an example, determining an egress interface may require performing one or more lookups using information ascertained from a network data unit in order to determine an egress interface. Such actions may be unnecessary if, for example, application of a security policy determines that some action (e.g., dropping the network data unit) is to be performed that does not include forwarding the network data unit from an egress interface. Therefore, the egress interface may not be determined until after application of security policies by a hardware offload component has been performed.

In Step 304, the method includes transmitting the plurality of network data units to a hardware offload component (e.g., the hardware offload component 208 of FIG. 2) of the network device prior to determining an egress interface for the plurality of network data units. In one or more examples, the plurality of network data units are transmitted to the hardware offload component based on processing performed by the switching component. In one or more examples, the network data units are transmitted to the hardware offload component using internal hardware of the network device. In one or more examples, the hardware offload component may receive additional information along with the network data units. For example, the switching component may process the network traffic units to determine various items of information (e.g., intended egress queue number), and such items of information may be provided to the hardware offload component along with the network data units.

In Step 306, the method includes processing, by the hardware offload component (e.g., the hardware offload component 208 of FIG. 2), the plurality of network data units to generate a flow report corresponding to the network traffic flow. As discussed above, a network traffic flow is a set of network data units having in common one or more characteristics. Thus, in one or more examples, a hardware offload component may store information (e.g., metadata) about network data units, individually and/or in aggregate, which will be used to generate a flow report (e.g., an IPFIX report, an SFlow report, any other type of flow report). The hardware offload component may be configured to generate flow reports when certain conditions exist. Examples include, but are not limited to, after certain amounts of time, when a certain number of network data units of a network traffic flow are received, upon occurrence of a certain event, at a point when one or more thresholds are reached, or any other relevant flow report trigger. In one or more examples, the flow report includes any relevant metadata related to and/or corresponding to the network traffic flow or network data units therein. However, as the network data units are provided to the hardware offload component prior to the determination of an egress interface for the network data units, the flow report does not include egress interface information.

As discussed above, processing of network data units of a network traffic flow by the hardware offload component may include other actions besides flow report generation (e.g., application of security policies of the network device) without departing from the scope of examples disclosed herein. Additionally, although not shown in FIG. 3, after processing a network data unit, the network data unit may be returned to a switching component (which may or may not be the same switching component from which the network data unit was received) for further processing, including, for example, determination of an egress interface for the network data unit.

In Step 308, the method includes transmitting the flow report from the hardware offload component (e.g., the hardware offload component 208 of FIG. 2) to a control plane (e.g., the control plane 210 of FIG. 2) of the network device (e.g., the network device 200 of FIG. 2). In one or more examples, the flow report is generated by the hardware offload component and formatted pursuant to flow monitoring standard (e.g., IPFIX), and the flow report is stored in a location accessible to elements of the control plane of the network device (e.g., in memory, in a designated storage location), such as an operating system or agent executing on one or more processors of the network device.

In Step 310, the method includes processing, in the control plane (e.g., the control plane 210 of FIG. 2) the flow report to determine an egress interface associated with the network traffic flow. In one or more examples, the flow report includes information about the network data units of the network traffic flow, such as, for example, source information, destination information, protocol information, and the like. Additionally, the control plane of a network device includes all of the information that is used to program elements of a data plane (e.g., forwarding elements) of a network device, such as, for example, a switching component. Therefore, using the information included in a flow report, the control plane may perform the same lookups that a switching component would perform, using the same information, in order to determine the egress interface that would be used for network data units of the network traffic flow corresponding to the flow report. As an example, network data units of a network traffic flow may be destined for the same destination address, and the destination address may be used by the control plane to perform one or more lookups to determine an egress interface associated with the destination address (e.g., the egress interface through which the destination address in reachable), which may be the same as or similar to the actions that a switching component performs in order to determine an egress interface for a network data unit.

In Step 312, the method includes updating the flow report to include the egress interface to obtain an updated flow report. In one or more examples, the flow report is received at the control plane (e.g., the control plane 210 of FIG. 2) from the hardware offload component (e.g., the hardware offload component 208 of FIG. 2) without information identifying an egress interface, as the egress interface for network data units of the network traffic flow corresponding to the flow report was not determined prior to generation of the flow report by the hardware offload component. Thus, after the control plane identifies the egress interface (e.g., in Step 310), the flow report may be augmented to include information identifying the egress interface. Therefore, when the flow report includes identification of queues for network data units of the network traffic flow, and the egress interface, the flow report may be used to identify both the egress interface and queues used for transmitting the network traffic flow.

In Step 314, the method includes transmitting the updated flow report to a remote collector (e.g., the collector device 120 of FIG. 1). The flow report may be transmitted using any suitable technique for transmitting information from one device (e.g., the network device) to another device (e.g., the collector). Based on the updating performed by the control plane of the flow report to include egress interface information, the collector may now identify the egress interface, and associated queues, used for transmitting the network traffic flow corresponding to the received flow report. Therefore, in one or more examples, the remote collector, which may also receive telemetry information from network devices (e.g., information, statistics, etc. related to the state of the network device, the quantities of network data units passing through various interfaces, queues, etc., queue depths, queue buffer memory usage), is able to correlate the telemetry information with the flow reports using the egress interface information with which the flow report was augmented by the control plane of the network device before the network device transmitted the flow report to the remote collector.

Figure 4:
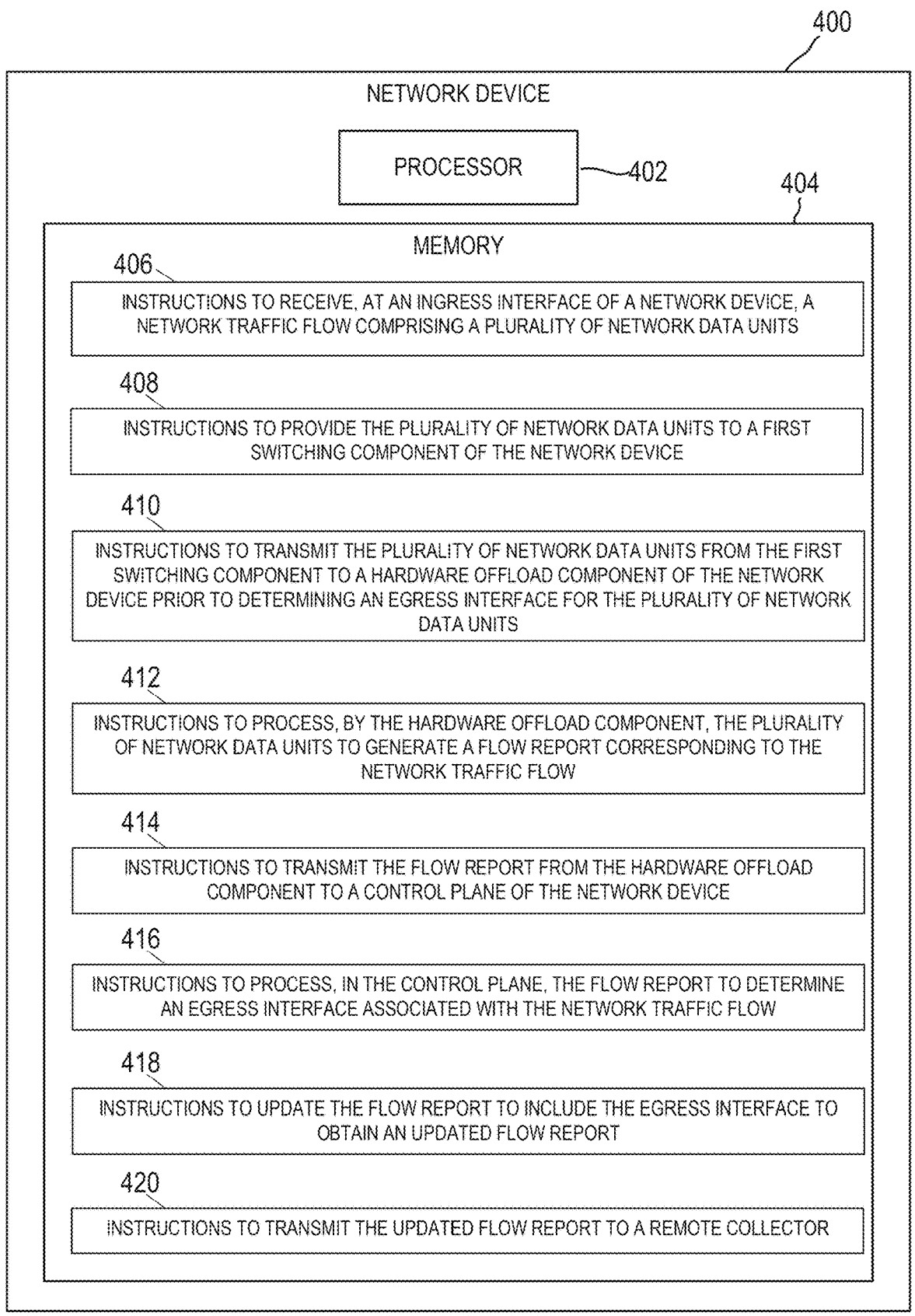
FIG. 4 illustrates a block diagram of a network device 400, in accordance with one or more examples disclosed herein.

FIG. 4 illustrates a block diagram of a network device 400, in accordance with one or more examples disclosed herein. The network device 400 is an example of the various network devices (e.g., the network devices 108, 110, 112, 114, 116, and 118 of FIG. 1, the network device 200 of FIG. 2) described above and/or of the computing device 500, described below. As discussed above in the descriptions of FIG. 1, FIG. 2, and FIG. 3, the network device 400 may be used to implement all or any portion of the various components shown in FIG. 1 and FIG. 2, and described above, such as, for example, the ingress interface 204 of FIG. 2, the switching component 206 of FIG. 2, the hardware offload component 208 of FIG. 2, the control plane 210 of FIG. 2, and the egress interface 212 of FIG. 2.

The network device 400 may include one or more processors 402 and memory 404. The memory 404 may include a non-transitory computer-readable medium that stores programming for execution by one or more of the one or more processors 402. In this implementation, one or more modules within the network device 400 may be partially or wholly embodied as software for performing any functionality described in this disclosure. The network device 400 may be, for example, configured to perform the method shown in FIG. 3 and described above, by executing instructions included in the memory 404 and executed by the one or more processors 402.

For example, the memory 404 may include instructions 406 to receive, at an ingress interface of a network device, a network traffic flow comprising a plurality of network data units (e.g., as described above in reference to Step 300 of FIG. 3).

For example, the memory 404 may include instructions 408 to provide the plurality of network data units to a first switching component of the network device (e.g., as described above in reference to Step 302 of FIG. 3).

For example, the memory 404 may include instructions 410 to transmit the plurality of network data units from the first switching component to a hardware offload component of the network device prior to determining an egress interface for the plurality of network data units (e.g., as described above in reference to Step 304 of FIG. 3).

For example, the memory 404 may include instructions 412 to process, by the hardware offload component, the plurality of network data units to generate a flow report corresponding to the network traffic flow (e.g., as described above in reference to Step 306 of FIG. 3).

For example, the memory 404 may include instructions 414 to transmit the flow report from the hardware offload component to a control plane of the network device (e.g., as described above in reference to Step 308 of FIG. 3).

For example, the memory 404 may include instructions 416 to process, in the control plane, the flow report to determine an egress interface associated with the network traffic flow (e.g., as described above in reference to Step 310 of FIG. 3).

For example, the memory 404 may include instructions 418 to update the flow report to include the egress interface to obtain an updated flow report (e.g., as described above in reference to Step 312 of FIG. 3).

For example, the memory 404 may include instructions 420 to transmit the updated flow report to a remote collector (e.g., as described above in reference to Step 314 of FIG. 3).

FIG. 5 illustrates a block diagram of a computing device, in accordance with one or more examples of this disclosure. As discussed above, examples described herein may be implemented using network devices, and the computing device 500 shown in FIG. 5 may be such a network device. For example, all or any portion of the components shown in FIG. 1 (e.g., the computing device A 100, the computing device B 102, the computing device C 104, the computing device D 106, the network device A 108, the network device B 110, the network device C 112, the network device D 114, the network device E 116, the network device 118, and the collector device 120) and FIG. 2 (e.g., the network device 200) may be examples of a computing device, and may include all or any portion of the components of the computing device 500 shown in FIG. 5 and described below. Additionally, all or any portion of the method shown in FIG. 3 may be performed using one or more computing devices, such as the computing device 500.

In one or more examples, a computing device (e.g., the computing device 500) is any device, portion of a device, or any set of devices capable of electronically processing instructions and may include, but is not limited to, any of the following: one or more processors (e.g. components that include circuitry) (e.g., the processor 502), memory (e.g., random access memory (RAM)) (not shown), input and output device(s) (e.g., the non-persistent storage 506), non-volatile storage hardware (e.g., solid-state drives (SSDs), persistent memory (Pmem) devices, hard disk drives (HDDs) (not shown)), one or more physical interfaces (e.g., network ports, storage ports) (e.g., the persistent storage 506), any number of other hardware components (not shown), and/or any combination thereof. As used herein, a processor may be any component that can be configured to execute operations, processes, threads, and the like. Examples of a processor include, but are not limited to, central processing units (CPUs), multi-core CPUs, application-specific integrated circuits (ASICs), accelerators (e.g., graphics processing units (GPUs)), and field programmable gate arrays (FPGAs).

The computing device 500 may include a communication interface 512 (e.g., Bluetooth interface, infrared interface, network interface, optical interface, any other type of communication interface), input devices 510, output devices 508, and numerous other elements (not shown) and functionalities. Each of these components is described below.

In one or more examples, the computer processor(s) 502 may be an integrated circuit for processing instructions. For example, the computer processor(s) may be one or more cores or micro-cores of a processor. The processor 502 may be a general-purpose processor configured to execute program code included in software executing on the computing device 500. The processor 502 may be a special purpose processor where certain instructions are incorporated into the processor design. The processor 502 may be an application specific integrated circuit (ASIC), a graphics processing unit (GPU), a data processing unit (DPU), a tensor processing units (TPU), an associative processing unit (APU), a vision processing units (VPU), a quantum processing units (QPU), and/or various other processing units that use special purpose hardware (e.g., field programmable gate arrays (FPGAs), System-on-a-Chips (SOCs), digital signal processors (DSPs)). Although only one processor 502 is shown in FIG. 5, the computing device 500 may include any number of processors without departing from the scope of examples disclosed herein.

The computing device 500 may also include one or more input devices 510, such as a touchscreen, keyboard, mouse, microphone, touchpad, electronic pen, motion sensor, or any other type of input device. The input devices 510 may allow a user to interact with the computing device 500. In one or more examples, the computing device 500 may include one or more output devices 508, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) 502, non-persistent storage 504, and persistent storage 506. Many different types of computing devices exist, and the aforementioned input and output device(s) may take other forms. In some instances, multimodal systems can allow a user to provide multiple types of input/output to communicate with the computing device 500.

Further, the communication interface 512 may facilitate connecting the computing device 500 to a network (not shown) (e.g., a local area network (LAN), a wide area network (WAN) such as the Internet, mobile network, or any other type of network) and/or to another device, such as another computing device. The communication interface 512 may perform or facilitate receipt and/or transmission of wired or wireless communications using wired and/or wireless transceivers of any type and/or technology. Examples include, but are not limited to, those making use of an audio jack/plug, a microphone jack/plug, a universal serial bus (USB) port/plug, an Apple® Lightning® port/plug, an Ethernet port/plug, a fiber optic port/plug, a proprietary wired port/plug, a Bluetooth® wireless signal transfer, a BLE wireless signal transfer, an IBEACON® wireless signal transfer, an RFID wireless signal transfer, near-field communications (NFC) wireless signal transfer, dedicated short range communication (DSRC) wireless signal transfer, 802.11 WiFi wireless signal transfer, WLAN signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 512 may also include one or more Global Navigation Satellite System (GNSS) receivers or transceivers that are used to determine a location of the computing device 500 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

The term computer-readable medium includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, and the like may be passed, forwarded, or transmitted via any suitable means including memory sharing, message passing, token passing, network transmission, or the like.

All or any portion of the components of the computing device 500 may be implemented in circuitry. For example, the components can include and/or can be implemented using electronic circuits or other electronic hardware, which can include one or more programmable electronic circuits (e.g., microprocessors, GPUs, DSPs, FPGAs, CPUs, CAMs, and/or other suitable electronic circuits), and/or can include and/or be implemented using computer software, firmware, or any combination thereof, to perform the various operations described herein. In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

In the above description, numerous details are set forth as examples of examples described herein. It will be understood by those skilled in the art (who also have the benefit of this disclosure) that one or more examples described herein may be practiced without these specific details, and that numerous variations or modifications may be possible without departing from the scope of the examples described herein. Certain details known to those of ordinary skill in the art may be omitted to avoid obscuring the description.

Specific details are provided in the description above to provide a thorough understanding of the aspects and examples provided herein. However, it will be understood by one of ordinary skill in the art that the aspects and examples may be practiced without these specific details. For clarity of explanation, in some instances the present technology may be presented as including functional blocks that may include devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects of examples disclosed herein.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not included in a figure. A process may correspond to a method, a function, a procedure, a subroutine, a subprogram, and the like. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, and the like. Examples of computer-readable media that may be used to store instructions, information used, and/or information created during methods according to described examples include magnetic or optical disks, flash memory, USB devices provided with non-volatile memory, networked storage devices, and so on.

In the above description of the figures, any component described with regard to a figure, in various examples described herein, may be equivalent to one or more same or similarly named and/or numbered components described with regard to any other figure. For brevity, descriptions of these components may not be repeated with regard to each figure. Thus, each and every example of the components of each figure is incorporated by reference and assumed to be optionally present within every other figure having one or more same or similarly named and/or numbered components. Additionally, in accordance with various examples described herein, any description of the components of a figure is to be interpreted as an optional example, which may be implemented in addition to, in conjunction with, or in place of the examples described with regard to a corresponding one or more same or similarly named and/or numbered component in any other figure.

Throughout the application, ordinal numbers (e.g., first, second, third) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While examples discussed herein have been described with respect to a limited number of examples, those skilled in the art, having the benefit of this disclosure, will appreciate that other examples can be devised which do not depart from the scope of examples as disclosed herein. Accordingly, the scope of examples described herein should be limited only by the attached claims.

What is claimed is:

1. A system, comprising:
   one or more processors; and
   one or more non-transitory computer readable media storing instructions which, when executed by the one or more processors, cause the one or more processors to:
   receive, at an ingress interface of a network device, a network traffic flow comprising a plurality of network data units;

provide the plurality of network data units to a first switching component of the network device;

transmit the plurality of network data units from the first switching component to a hardware offload component of the network device prior to determining an egress interface for the plurality of network data units;

process, by the hardware offload component, the plurality of network data units to generate a flow report corresponding to the network traffic flow;

transmit the flow report from the hardware offload component to a control plane of the network device;

process, in the control plane, the flow report to determine an egress interface associated with the network traffic flow;

update the flow report to include the egress interface to obtain an updated flow report; and transmit the updated flow report to a remote collector.

2. The system of claim 1, wherein the hardware offload component is configured to apply a security policy configured on the network device.

3. The system of claim 1, wherein the flow report comprises a queue number associated with one or more network data units of the plurality of network data units of the network traffic flow.

4. The system of claim 1, wherein execution of the instructions further causes the one or more processors to:

transmit the plurality of network data units from the hardware offload component to a second switching component after the flow report is generated;

process, by the second switching component and after receiving the plurality of network data units, the plurality of network data units to determine the egress interface from which to transmit the plurality of network data units; and transmit the plurality of network data units using the egress interface.

5. The system of claim 4, wherein the first switching component and the second switching component are the same switching component.

6. The system of claim 1, wherein the remote collector also receives telemetry data from the network device, wherein the telemetry data comprises queue information about queues of the network device and egress interfaces associated with the queues.

7. The system of claim 1, wherein execution of the instructions further causes the one or more processors to:

associate a portion of queue information associated with a particular queue of a particular egress interface of the network device with the flow report received from the network device based on the egress interface and a queue number included in the flow report.

8. A computer-implemented method, comprising:

receiving, at an ingress interface of a network device, a network traffic flow comprising a plurality of network data units;

providing the plurality of network data units to a switching component of the network device;

transmitting the plurality of network data units from the switching component to a hardware offload component of the network device prior to determining an egress interface for the plurality of network data units;

processing, by the hardware offload component, the plurality of network data units to generate a flow report corresponding to the network traffic flow;

transmitting the flow report from the hardware offload component to a control plane of the network device;

processing, in the control plane, the flow report to determine an egress interface associated with the network traffic flow;

updating the flow report to include the egress interface to obtain an updated flow report; and transmitting the updated flow report to a remote collector.

9. The computer-implemented method of claim 8, wherein the hardware offload component is configured to apply a security policy configured on the network device.

10. The computer-implemented method of claim 8, wherein the flow report comprises a queue number associated with one or more network data units of the plurality of network data units of the network traffic flow.

11. The computer-implemented method of claim 8, further comprising:

transmitting the plurality of network data units from the hardware offload component to the switching component after the flow report is generated;

processing, by the switching component and after receiving the plurality of network data units from the hardware offload component, the plurality of network data units to determine the egress interface from which to transmit the plurality of network data units; and transmitting the plurality of network data units using the egress interface.

12. The computer-implemented method of claim 8, wherein the remote collector also receives telemetry data from the network device, wherein the telemetry data comprises queue information about queues of the network device and egress interfaces associated with the queues.

13. The computer-implemented method of claim 8, further comprising:

associating a portion of queue information associated with a particular queue of a particular egress interface of the network device with the flow report received from the network device based on the egress interface and a queue number included in the flow report.

14. A non-transitory computer-readable medium storing programming for execution by one or more processors, the programming comprising instructions to:

receive, at an ingress interface of a network device, a network traffic flow comprising a plurality of network data units;

provide the plurality of network data units to a first switching component of the network device;

transmit the plurality of network data units from the first switching component to a hardware offload component of the network device prior to determining an egress interface for the plurality of network data units;

process, by the hardware offload component, the plurality of network data units to generate a flow report corresponding to the network traffic flow;

transmit the flow report from the hardware offload component to a control plane of the network device;

process, in the control plane, the flow report to determine an egress interface associated with the network traffic flow;

update the flow report to include the egress interface to obtain an updated flow report; and transmit the updated flow report to a remote collector.

15. The non-transitory computer-readable medium of claim 14, wherein the hardware offload component is configured to apply a security policy configured on the network device.

16. The non-transitory computer-readable medium of claim 14, wherein the flow report comprises a queue number associated with one or more network data units of the plurality of network data units of the network traffic flow.

17. The non-transitory computer-readable medium of claim 14, wherein the programming comprises further instructions to:
- transmit the plurality of network data units from the hardware offload component to a second switching component after the flow report is generated;
- process, by the second switching component and after receiving the plurality of network data units, the plurality of network data units to determine the egress interface from which to transmit the plurality of network data units; and
- transmit the plurality of network data units using the egress interface.

18. The non-transitory computer-readable medium of claim 17, wherein the first switching component and the second switching component are the same switching component.

19. The non-transitory computer-readable medium of claim 14, wherein the remote collector also receives telemetry data from the network device, wherein the telemetry data comprises queue information about queues of the network device and egress interfaces associated with the queues.

20. The non-transitory computer-readable medium of claim 14, wherein the programming comprises further instructions to:
- associate a portion of queue information associated with a particular queue of a particular egress interface of the network device with the flow report received from the network device based on the egress interface and a queue number included in the flow report.

\* \* \* \* \*